No. 638,217. Patented Dec. 5, 1899.
G. C. CROUSE & J. J. FOLEY.
REGULATOR AND AUTOMATIC SHUT-OFF.
(Application filed Aug. 16, 1899.)

(No Model.) 2 Sheets—Sheet 1.

WITNESSES:
J. P. Appleman
E. E. Potter

INVENTORS
George C. Crouse.
John J. Foley.
BY
N. C. Everts & Co.
ATTORNEYS.

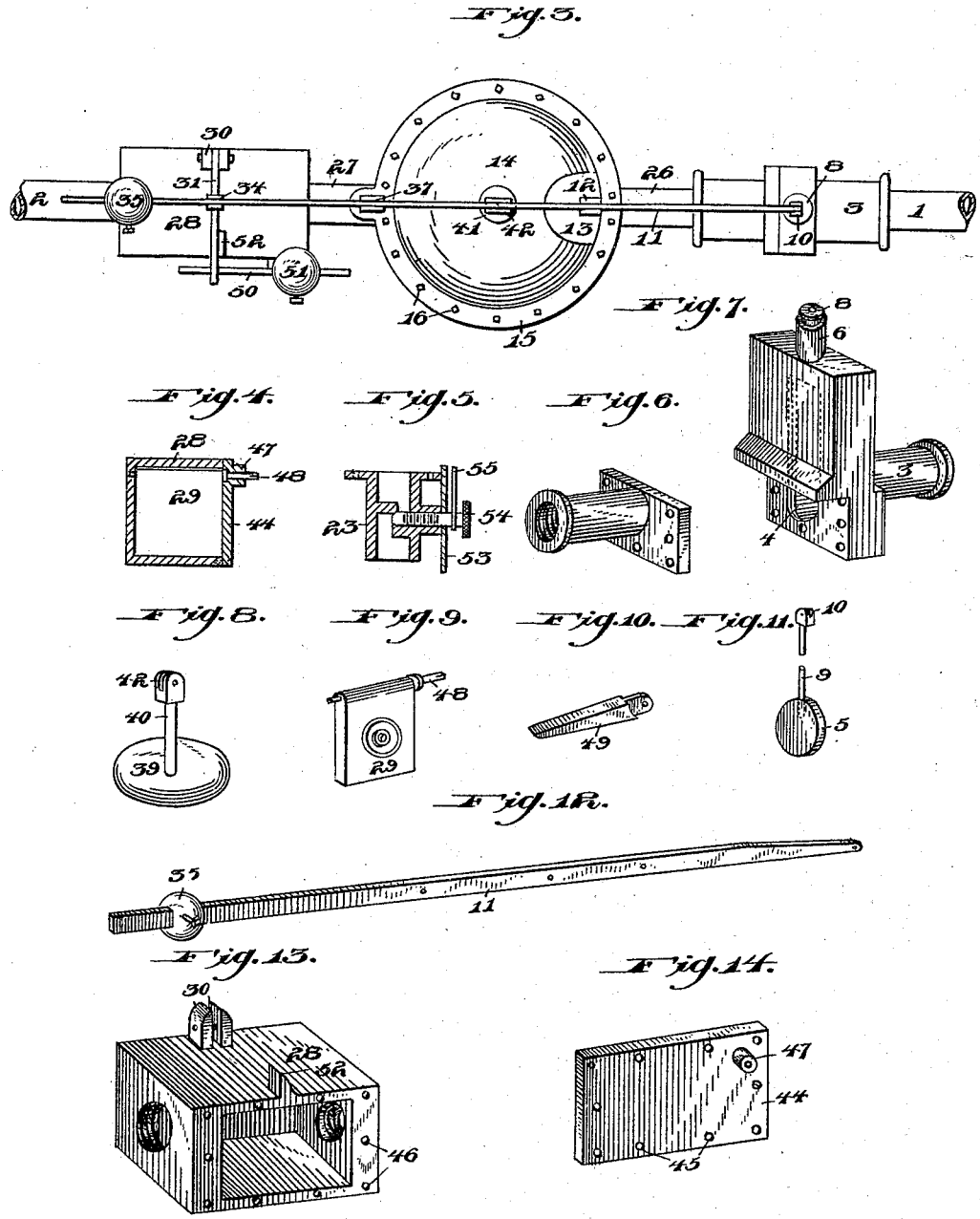

UNITED STATES PATENT OFFICE.

GEORGE C. CROUSE AND JOHN J. FOLEY, OF WEST UNION, WEST VIRGINIA.

REGULATOR AND AUTOMATIC SHUT-OFF.

SPECIFICATION forming part of Letters Patent No. 638,217, dated December 5, 1899.

Application filed August 16, 1899. Serial No. 727,410. (No model.)

*To all whom it may concern:*

Be it known that we, GEORGE C. CROUSE and JOHN J. FOLEY, citizens of the United States of America, residing at West Union, in the county of Doddridge and State of West Virginia, have invented certain new and useful Improvements in Gas-Regulators and Automatic Shut-Offs, of which the following is a specification, reference being had therein to the accompanying drawings.

This invention relates to certain new and useful improvements in gas-pressure regulators, and has for its object the provision of novel means whereby any desired gas-pressure may be obtained.

The invention has for its further object to construct a device of the above-referred-to class, wherein the gas-supply is automatically cut off in case an excess pressure in the main supply-pipe takes place.

The invention, briefly described, consists of a gate that will regulate the gas-inlet and a balance check-valve that will regulate the outlet or supply pipe, the said gate and balance-valve being regulated by means of a collapsible bag and other mechanism that will be hereinafter described.

The invention finally consists in the novel construction, combination, and arrangement of parts, to be hereinafter more fully described, and specifically pointed out in the claims.

In describing the invention in detail reference is had to the accompanying drawings, forming a part of this specification, wherein like numerals of reference indicate corresponding parts throughout the several views, and in which—

Figure 1:
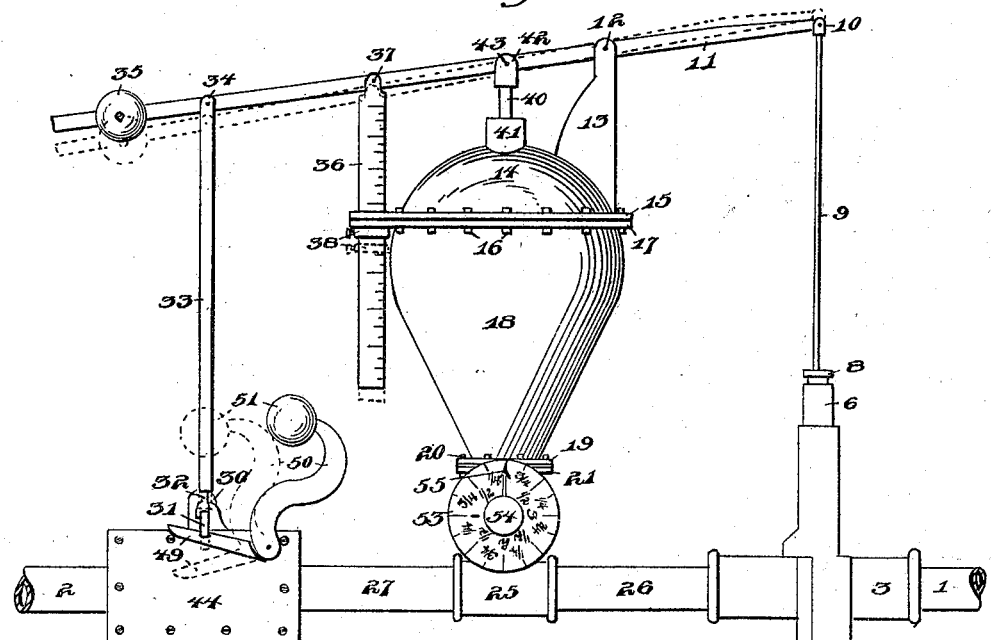
Figure 2:
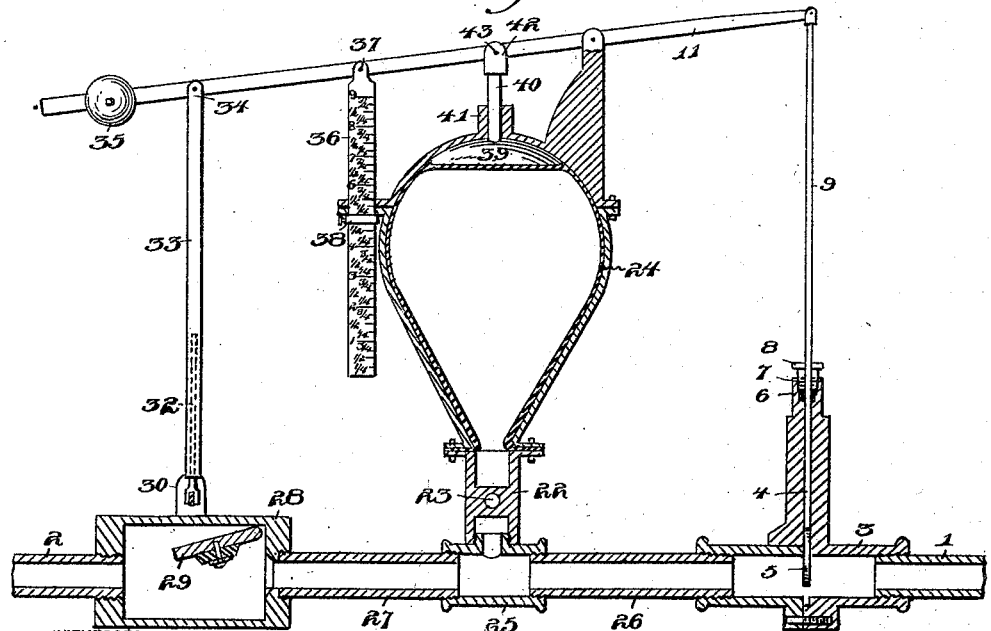

Figure 1 is a side elevation of our improved gas-pressure regulator and automatic shut-off. Fig. 2 is a vertical sectional view of the same. Fig. 3 is a top plan view of the same. Fig. 4 is a vertical sectional view of the gas-chamber carrying the balance check-valve. Fig. 5 is a vertical sectional view of the gas-regulating valve leading to the collapsible bag. Fig. 6 is a perspective view of the coupling leading to the inlet. Fig. 7 is a similar view of the casing forming the inlet. Fig. 8 is a perspective view of the disk and stem arranged upon and operated by the collapsible bag. Fig. 9 is a perspective view of the balance check-valve regulating the outlet to the gas-supply. Fig. 10 is a perspective view of the trip-arm. Fig. 11 is a perspective view of the gate arranged in the inlet. Fig. 12 is a perspective view of the balance lever-weight. Fig. 13 is a perspective view of the gas-chamber with the front plate removed. Fig. 14 is a perspective view of the front plate of the gas-chamber.

Referring to the drawings by reference-numerals, 1 indicates the gas-inlet leading from the main feed-pipe, and the reference-numeral 2 indicates the outlet or supply pipe. The said inlet-pipe 1 is coupled to a casing 3, said casing having formed therein an opening 4, said opening extending upwardly and adapted to receive the gate 5, said gate operating in said opening and regulating the inlet or supply of gas from the feed-pipe. A bushing 6 is formed integral with said casing, said bushing having formed therein a screw-threaded opening 7, which is adapted to receive a screw-threaded plug 8. A rod 9 is adapted to operate through the said plug, bushing, and casing and being secured at its lower end to said gate 5 and having its upper end bifurcated, as shown at 10, to receive a balance-lever 11, said balance-lever being fulcrumed at 12 to a bearing 13, formed integral with the upper end 14 of the bulb. The lower end of the said bulb carries an annular flange 15, said flange being apertured and adapted to receive bolts 16, passing through the apertured annular flange 17 and the lower section of the bulb 18. At the lower extremity of the bulb 18 and formed integral therewith is formed an annular flange 19, said flange being likewise apertured to receive bolts 20, serving as fastening means and extending through a similar apertured flange 21, formed in the casing 22, containing the gas-regulating valve 23, to the collapsible bag 24, arranged in the sections of the bulb 14 and 18. The lower extremity of the said casing 22 is coupled to a fitting 25, connecting with a pipe 26, forming a connection between said fitting 25 and the casing 3. To the other end of said fitting 25 is arranged a pipe 27, connecting to the gas-chamber 28, having arranged therein the balance check-valve 29. The said gas-chamber 28 carries a bearing 30, in which is pivotally secured an arm 31, upon which is arranged an upwardly-extending rod 32, a sleeve 33 fitting over and surrounding said rod 32. The upper extremity of said sleeve 33 is bifurcated, as at 34, for the reception of the end of the balance-lever 11, the latter being pivotally secured thereto. The said balance-lever 11 is further provided with a weight 35, which is slidably secured thereon, and said balance-lever is still further provided with a scale 36, which is pivoted to said lever at 37 and extends through a yoke 38, arranged to the exterior of the lower section of the bulb 18.

The reference-numeral 39 indicates a disk arranged upon the collapsible gas-bag, said disk carrying a stem 40, which is adapted to operate through the boss 41, arranged and formed integral with the upper section 14 of the bulb. At the upper extremity of the said rod is secured a bifurcated bearing 42, adapted to receive the said lever 11, which is pivotally secured thereto, as at 43.

A removable plate 44, having formed therein apertures 45, is secured to the gas-chamber 28, which also has arranged therein apertures 46 for the reception of fastening means. A collar 47 is rigidly secured to the plate 44, through which extends a shaft 48, which is secured to the balance check-valve 29. At the outer end of the said shaft are attached a trip-arm 49 and a lever-arm 50, said lever-arm being provided at its free end with a weight 51. A guide 52 is also arranged upon the gas-chamber 28, said guide regulating the movement of the arm 31.

Upon the front of the casing 22 is secured a dial 53. A regulating-screw 54, passing through said dial and forming valve 23, carries an indicator 55, which is rigidly secured to the forward end of the said screw.

The operation of the device is as follows: Assuming that all parts are in proper position, and for the purpose of more clearly illustrating our invention, we will first describe the operation of our automatic gas-regulator and shut-off in case there is an excess pressure from the main pipe or supply. To obtain the requisite number of ounces of pressure of gas, the screw 54 is turned, carrying with it the indicator, and opening the valve sufficiently to allow the collapsible bag to expand to such a degree that will carry the disk 39 to such a point that will regulate the inlet governed by the gate for a certain amount of gas to enter the regulator to produce the desired pressure, the balance check-valve 29 being retained open by the pressure that will be brought to bear against the same, and allowing the gas to travel through the pipe 2 into the supply-pipe of the dwelling, as the case may be. In case there is an excess pressure the collapsible bag 24 will further expand and will carry upwardly with it the disk 39, to which is attached the rod 40, thereby tilting the balance-lever 11 downwardly and closing the inlet-port, by means of the gate 5, to a sufficient degree to compensate for the excess pressure. Thus the pressure will be accurately and automatically regulated. We will now assume that the pressure in the main pipe temporarily ceases. In this case the bag 24 will collapse, allowing the downward movement of the rod 40 and 33. The end of the latter will then engage the arm 32, forcing the trip-arm 31 downwardly and simultaneously operating the lever 50, which will by gravity operate and close the balance check-valve 29. When the pressure is again restored in the main pipe, in order to again obtain a supply of gas it will be required to tilt the lever 50 to its normal position.

We have shown in dotted lines of Fig. 1 of the drawings the operation of the device, and in view of the above description a further explanation as to the operation is deemed unnecessary.

Particular attention is directed to the fact that our improved gas-pressure regulator and automatic shut-off will automatically close and shut off the supply of gas both in cases where there is an excess pressure and where there is a low pressure, and therefore provides a safeguard in regulators of this class against any marked variations that may take place in the main pipes. The many advantages thus obtained will be readily apparent, as explosions and conflagrations are caused either by one or the other of the extremes—namely, a sudden high pressure or a temporary lack of pressure.

It will be particularly noted that various changes may be made in the details of construction of our improved device without departing from the general spirit of our invention.

Having thus fully described our invention, what we claim as new, and desire to secure by Letters Patent, is—

1. In a gas regulator and cut-off, the combination with a suitable gas inlet and outlet, of a casing connected to said inlet, and provided with an upwardly-extending projection, having an opening arranged therein, a rod 9 operating through the said opening and extending above the same, a gate secured to the lower end of the said rod, a gas-chamber connected to the said outlet, a plate secured to one side of the said chamber, a collar formed integral therewith, a shaft rotatably mounted therein, a check-valve secured to the said shaft, pipe connections between said chamber and casing, a bulb, connections between said bulb and pipe connections, a regulating-valve arranged therein, a collapsible bag arranged in said bulb, a bearing mounted on the said gas-chamber, an arm pivotally secured thereto, a rod 32 connected to the said arm, an elongated sleeve mounted on the said rod 32, and connections between said rods 9 and 32 for operating the trip mechanism and said gate, substantially as set forth.

2. In a gas regulator and cut-off, the combination with a suitable gas inlet and outlet, of a casing connected to the said inlet and provided with an upwardly-extending projection having an opening arranged therein, a rod 9 operating through the said opening and extending above the same, a gate secured to the lower end of the said rod, a gas-chamber connected to the said outlet, a plate secured to one side of the said chamber, a collar formed integral therewith, a shaft rotatably mounted therein, a check-valve secured to the said shaft and operating in said gas-chamber, suitable trip mechanism connected to the said shaft, pipe connections between said chamber and casing, a bulb, connections between said bulb and pipe connections, a regulating-valve arranged therein, a collapsible bag arranged in said bulb, a bearing mounted on said gas-chamber, an arm pivotally secured thereto, a rod 32 connected to the said arm, an elongated sleeve mounted on the said rod 32, a lever connecting the rods 9 and 32 together, and means connected to the said lever and operated by the said collapsible bag for operating the said lever, substantially as set forth.

In testimony whereof we affix our signatures in the presence of two witnesses.

GEORGE C. CROUSE.
    JOHN J. FOLEY.

Witnesses:
 M. R. CROUSE,
 WILLIE NOBLE.